United States Patent
Tuhro

(10) Patent No.: US 6,330,074 B1
(45) Date of Patent: Dec. 11, 2001

(54) DIGITAL COPIER MAGNIFICATION AND DISTORTION CORRECTION

(75) Inventor: Richard H. Tuhro, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/182,787

(22) Filed: Oct. 30, 1998

(51) Int. Cl.[7] .................................................. G06F 15/00
(52) U.S. Cl. ........................ 358/1.7; 358/1.6; 358/1.5; 358/296
(58) Field of Search ........................ 358/1.7, 1.6, 1.5, 358/410, 401, 409, 296

(56) References Cited

U.S. PATENT DOCUMENTS

| | | | |
|---|---|---|---|
| 4,689,690 | * 8/1987 | Aagano | 358/410 |
| 4,926,263 | * 5/1990 | Yokota | 358/409 |
| 5,006,705 | 4/1991 | Saito et al. | 250/235 |
| 5,229,760 | 7/1993 | Curry | 345/20 |

* cited by examiner

Primary Examiner—Cheukfan Lee
(74) Attorney, Agent, or Firm—John M. Kelly; David E. Henn

(57) ABSTRACT

A method of and an apparatus for reducing or eliminating scan line magnification errors in digital copiers that use an input scanner and a raster output scanner. The input scanner integration period, and thus the input scan line rate, is synchronized with the rotation of the raster output scanner, and thus the output scan line rate. Synchronization might be achieved using either a one to one input scan line to output scan line ratio, or by scanning multiple output scan lines for each input scan line. Beneficially, the principles of the present invention are implemented by synchronizing the input scan rate of an input scanner with the rotation of a polygon of a raster output scanner using a start of scan detector.

10 Claims, 2 Drawing Sheets

DIGITAL COPIER MAGNIFICATION AND DISTORTION CORRECTION

This invention relates to digital copiers. In particular, this invention relates to reducing defects caused by polygon motion variations in digital copiers having an input scanner and a raster output scanner.

BACKGROUND OF THE INVENTION

Electrophotographic marking is a commonly used method of copying or printing documents. Electrophotographic marking is performed by exposing a substantially uniformly charged photoreceptor with a light image representation of a desired document. In response, the photoreceptor discharges, creating an electrostatic latent image of the desired document on the photoreceptor's surface. Toner particles are then deposited onto that latent image, forming a toner image. That toner image is then transferred from the photoreceptor onto a substrate such as a sheet of paper. The transferred toner image is then fused to the substrate, usually using heat and/or pressure, thereby creating a copy of the desired image. The surface of the photoreceptor is then cleaned and recharged for the production of another image.

One way of exposing the photoreceptor is to use a Raster Output Scanner (ROS). A ROS is comprised of a laser light source (or sources) and a rotating polygon having a plurality of mirrored facets. The light source radiates a laser beam onto the polygon facets. That beam reflects from the facets and strikes the photoreceptor, producing a light spot. As the polygon rotates the spot traces lines, referred to as scan lines, on the photoreceptor. By moving the photoreceptor as the polygon rotates, the photoreceptor is raster scanned by the spot. During scanning, the laser beam is modulated according to image information so to produce the desired latent image.

The foregoing broadly describes the operation of an electrophotographic marking machine. Such marking machines are often used in digital copiers. In addition to an electrophotographic marking machine, digital copiers include an input scanner that scans an image on an original document so as to produce a digital representation of that image. Then, the electrophotographic marking machine reproduces that image, possibly after being modified according to one or more user requirements.

Digital input scanners typically employ one or more arrays of photosensitive elements, such as charge coupled devices ("CCDs"), an illumination lamp, and an optical system. The lamp illuminates an original document and the optical system focuses light reflected from the illuminated document onto the photosensitive elements. Since the reflected light intensity varies according to the image on the document, the photosensitive elements are able to convert the reflected light into electrical signals that represent the document. Typically, the document is scanned as a sequence of line images, with each line image being referred to as a scan line. Thus, two uses are made of the term—scan line—, one referring to lines that are produced by sweeping the laser beam spot across the photoreceptor, the other referring to a line image scanned by the input scanner.

Conventionally, each input scan line is imaged during an integration period of a predetermined duration. During the integration period the photosensitive elements produce charges that are proportionate with the intensity of their input light. Those charges are accumulated on a capacitor. At the end of the integration period, the stored charges result in a potential that is then digitized to represent the charge buildup. The duration of the integration period, which must be sufficiently long to fully integrate the image line being scanned, yet not so long as to allow the photosensitive elements to saturate, is set by a fixed rate clock signal in the prior art.

It can be seen that input scanners and raster output scanners are both characterized by scan lines. An input scanner might scan 400 lines per inch while a raster output scanner might write 1200 lines per inch. In the prior art, the input scanner scan rate is set by an oscillator that is derived from a crystal source (possibly via a microprocessor timer that is programmed to slightly vary the oscillator frequency). However, because the output scan rate depends upon the mechanical rotation of a polygon, the output scan rate is difficult to control accurately. In the prior art the resulting variations between a highly stable input scan rate and a far less stable output scan rate typically did not matter because the digitized input image is usually stored in a "buffer memory." The input image data is then read from the buffer memory as required. Essentially, in the prior art the input scanner data flow is synchronized with polygon motion.

While the prior art scheme of handling polygon motion variations is successful, it is not suitable for highly cost sensitive digital copiers. Not only must a buffer memory and an input scanner oscillator be provided, but also synchronization circuitry between the buffer memory and the polygon is required. Otherwise, variations in polygon rotational velocity (which might be +/−0.1% of nominal) would result in "slow scan magnification errors." The slow scan direction is the direction perpendicular to the scan line traced by the spot and is brought about by the motion of the photoreceptor. Basically, if the polygon is rotating too slow the photoreceptor motion would cause the image to magnified in the slow scan direction, if the polygon is rotating too fast, the photoreceptor motion would cause the image to be reduced in the slow scan direction.

Because scan line magnification errors are detrimental to print quality a technique of reducing or eliminating such errors would be beneficial. Even more beneficial would be a technique of reducing or eliminating scan line magnification errors that is suitable for cost sensitive machines.

SUMMARY OF THE INVENTION

This invention relates to a technique of reducing or eliminating scan line magnification errors. According to the principles of the present invention input scanner integration period is synchronized with the rotation of the raster output scanner. Synchronization might be achieved either directly, or by using an integral multiple of the input scan rate. By synchronizing the input scan rate with the output scan rate, slow scan multiplication errors are reduced or eliminated.

Beneficially, principles of the present invention are implemented by synchronizing the input scan rate of an input scanner with the rotation of a polygon of a raster output scanner using a start of scan detector.

BRIEF DESCRIPTION OF THE DRAWINGS

The principles of the present invention will become apparent from the descriptions that follow when read in conjunction with the accompanying figures, wherein.

DETAILED DESCRIPTION OF AN EMBODIMENT OF THE INVENTION

Figure 1:
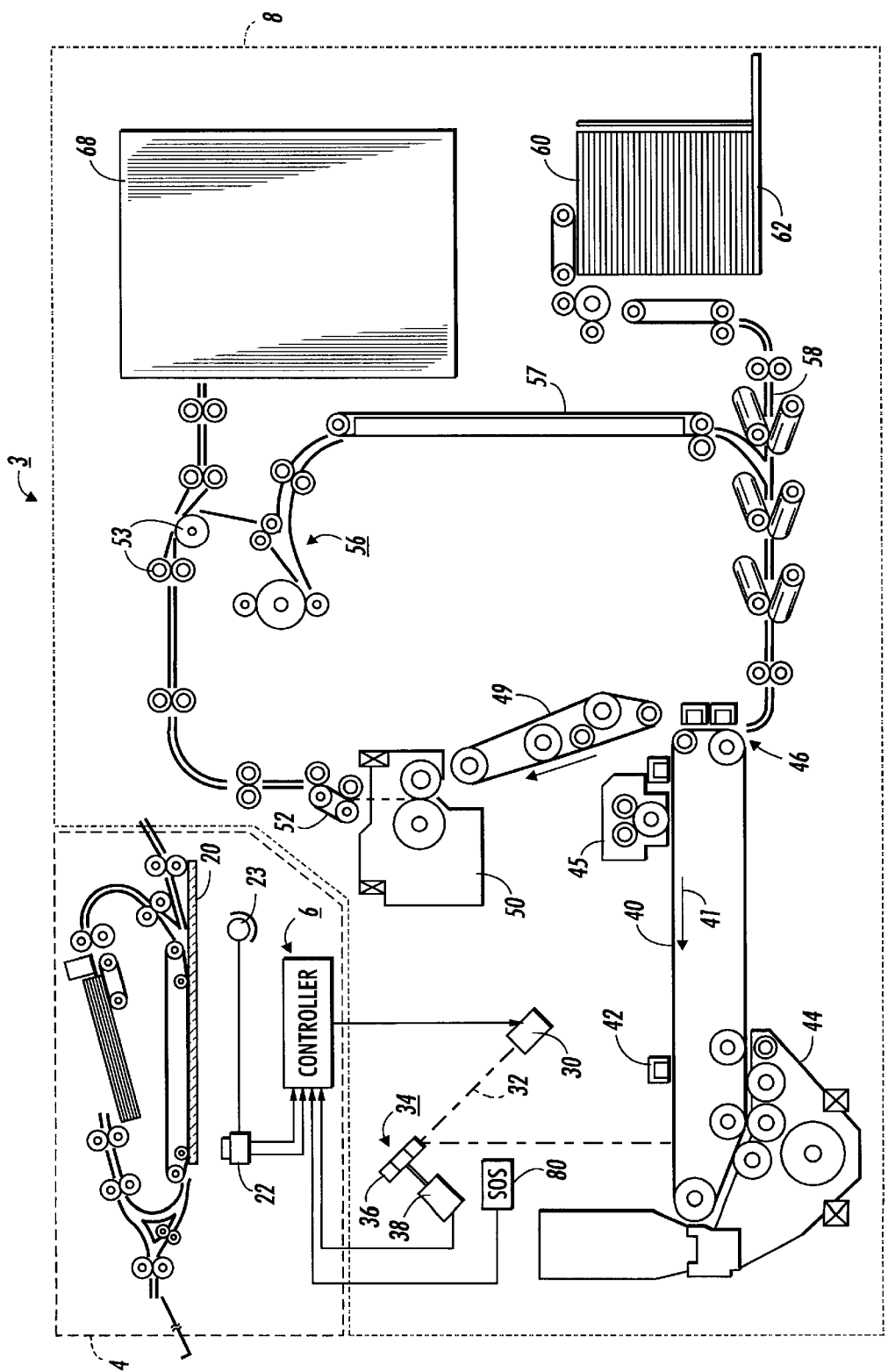
FIG. 1 is a schematic view depicting an illustrative electrophotographic printing machine that incorporates the present invention.

FIG. 1 shows an exemplary digital copier 3 that is in accord with the principles of the present invention. Generally, the printing system includes an input scanner 4, a controller section 6, and a printer 8. The input scanner 4 includes a transparent platen 20 on which a document being scanned is located. One or more photosensitive element arrays 22, beneficially charge couple devices (CCD) and a lamp 23 are supported for relative scanning movement below the platen 20. The lamp illuminates the document on the platen while the photosensitive element array 22 produces image pixel signals from the light reflected from the document. After suitable processing the image pixel signals are converted to digital data signals that are sent to the controller section 6.

The control section 6, sometimes called an electronic subsystem (ESS), processes the digital data signals from the scanner section so as to enable reproduction of the image on the document. The control section 6 includes control electronics that prepares and manages the flow of digital data from the input scanner 4 to the printer 8. The control section 6 may include a user interface suitable for enabling an operator to program a particular print job, a memory for storing information, and, specifically important to the present invention, circuitry for synchronizing and controlling the overall operation of the copier 3. The controller section 6 sends the processed digital data signals to the printer 8 as video data signals.

The printer 8 is a laser-printer that includes a raster output scanner that produces a latent electrostatic image on a photoreceptor 40. The raster output scanner includes a laser diode 30 that produces a laser beam 32 that is modulated in accordance with the video data signals from the control section 6. The video data signals encode the laser beam with information suitable to reproduce the scanned in image. The laser beam 32 is directed onto a rotating polygon 34 that has a plurality of mirrored facets 36. The polygon is rotated by a polygon motor 38. As the polygon rotates, the laser beam 32 reflects from the facets and sweeps across the photoreceptor 40 as the photoreceptor moves in the direction 41. The sweeping laser beam exposes an output scan line on the photoreceptor 40, thereby creating an output scan line latent electrostatic image. As the photoreceptor moves in the direction 41, by properly modulating the laser diode 30 subsequent output scan lines produce an electrostatic latent image on the photoreceptor that represents the desired image.

Before exposure, the photoreceptor is charged by a corotron 42. After exposure, the electrostatic latent image is developed by a developer 44. The result is a toner image on the photoreceptor 40. That toner image is transferred at a transfer station 46 onto a substrate 60 that is moved from an input tray 62 to the transfer station by a document handler 58. After transfer, the substrate is advanced by a document transport 49 into a fusing station 50. The fusing station permanently fuses the toner image to the substrate 60. After the toner image is transferred a cleaning station 45 removes residual toner particles and other debris on the photoreceptor 40.

After fusing, the substrate 60 is passed through a decurler 52. The decurler 52 bends the sheet in a first direction to put a known curl on the substrate, and then it bends the substrate in the opposite direction to remove that curl. Forwarding rollers 53 then advance the substrate either to an output tray 68 (if simplex printing or after the fusing of a second image in duplex operation) or to a duplex inverter 56 that inverts the substrate. An inverted substrate travels via a transport 57 back into the document handler 58 for registration with a second toner image on the photoreceptor 40. After registration, the second toner image is transferred to the substrate at transfer station 46. The substrate then passes once again through the fuser 50 and the decurler 52. The forwarding rollers 53 then advance the substrate to the output tray 68.

The foregoing generally describes the general operation of the digital copier 3. The principles of the present invention directly relate to synchronizing the operation of the input scanner 4 with the rotation of the polygon 34. To that end, the digital copier 3 includes a start-of-scan detector 80 that senses when the laser beam is at a predetermined position. The output of the start-of-scan-detector 80 is input to the controller section 6.

Figure 2:
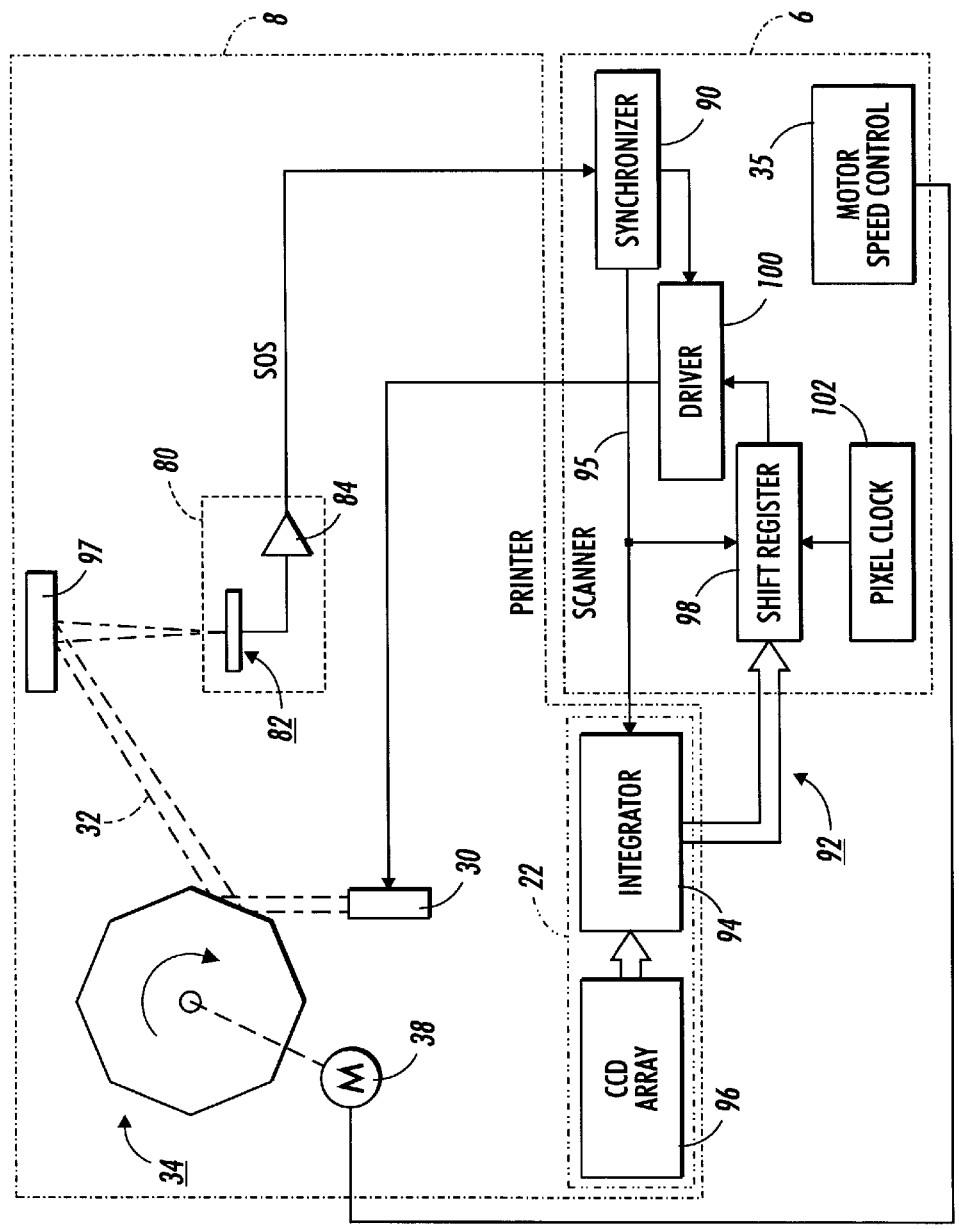
FIG. 2 is a simplified schematic view of selected machine elements of the electrophotographic printing machine shown in FIG. 1.

FIG. 2 assists the explanation of a preferred embodiment of the present invention. A start-of-scan-detector 80 having a sensor 82, beneficially a photodiode, senses when the laser beam 32 is at a predetermined position. The output of the sensor 82 is applied to a pulse generator 84 that generates a start-of-scan signal. The start-of-scan signal is applied to a synchronizer 90 within the control section 6.

Also applied to the control section 6 via a bus 92 are the digital data signals from the photosensitive array 22. In particular, the digital data signals are the outputs of an integrator 94 within the photosensitive array 22. That integrator receives a plurality of charging currents, one charging current from each photosensitive element of a CCD array 96. Those charging currents are proportional to the number of photons that strike the photosensitive elements. In turn, the number of photons are dependent upon the image on the document on the platen 20 (reference FIG. 1). The integrator also receives an integrate signal from the synchronizer 90 via a line 95. In some cases that integrate signal might just be the start of scan signal In other cases the integrate signal might occur a predetermined period of time after a start of scan signal. In other case the integrate signal might only occur once for every N number of start of scan signals (where N is beneficially an integer). However, when an integrate signal is received, the integrator begins accumulating charging currents from the photosensitive elements. When the next integrate signal is received the integrator compares the accumulated charges against a predetermined charge level. If the accumulated charge from a particular photosensitive element exceeds the predetermined charge level the integrator outputs a logic HIGH on a bus 92 line that corresponds to that photosensitive element. Otherwise, the integrator outputs a logic LOW on the bus 92 line for that photosensitive element. Therefore, the outputs of the photosensitive array 22 are synchronized in some fashion with start-of-scan signals, and thus with the rotation of the polygon 34.

It should be apparent that the input scanner and the output scanner do not need to have the same number of scan lines. If the output scan line rate (in scan lines per centimeter) is an integer multiple (N) of the input scan line rate, by producing one integrate signal for every N start-of-scan signals the input scanner can be synchronized with the output scanner. It is also possible to start integration based upon the occurrence of an integrate signal, but to stop integration a fixed period of time later.

Still referring to FIG. 2, the digital data from the photosensitive array 22 is stored within the controller section 6 in a shift register 98. The operation of the shift register is synchronized with the operation of the integrator via the integrate signal on the line 95 such that the signals from the integrator are "captured" by the shift register. The information stored in the shift register is then clocked out of the shift register to a laser driver 100 according to a pixel clock 102 within the control section. The laser driver then drives the laser 30 according to the digital information.

Still referring to FIG. 2, while the operation of the input scanner is synchronized to the rotation of the polygon 34, it is still beneficial to maintain stabilize the angular frequency of the polygon 34. To that end, the motor 38 that turns the polygon 34 is controlled by a motor speed control 35. Additionally, it is often beneficial to use a mirror 97 to reflect light from the sweeping laser beam 32 into the start of scan sensor 80. This enables the start of scan sensor to be placed in a more convenient location.

It is to be understood that while the figures and the above description illustrate the principles of the present invention, they are exemplary only. Others who are skilled in the applicable arts will recognize numerous modifications and adaptations of the illustrated embodiments that will remain within the principles of the present invention. Therefore, the present invention is to be limited only by the appended claims.

What is claimed:

1. An digital copier, comprising:
   a photoreceptor moving in a process direction;
   a raster output scanner including a laser source that produces a laser beam and a rotating, multifaceted polygon for reflecting said laser beam as a sweeping beam across said photoreceptor so as to produce a plurality of output scan lines;
   a start of scan detector for detecting said sweeping beam and for producing a plurality of start of scan signals, wherein the time between start of scan signals depends upon the rotation of said multifaceted polygon; and
   an input scanner for digitizing an image on an original source, said input scanner including a light source for radiating light onto the original source; an array of photosensitive elements for producing a plurality of charging currents, wherein each current depends upon the light reflected from a pixel area of the image on the original source; and an integrator for integrating said plurality of charging currents for an integration period;
   wherein said integration period is a function of the time between start of scan signals.

2. A digital copier according to claim 1, wherein said integration period is a an integer multiple of the time between start of scan signals.

3. A digital copier according to claim 2, wherein said integer multiple is one.

4. An digital copier, comprising:
   a photoreceptor moving in a process direction;
   a raster output scanner including a laser source that produces a laser beam and a rotating, multifaceted polygon for reflecting said laser beam as a sweeping beam across said photoreceptor so as to produce a plurality of output scan lines;
   a start of scan detector for detecting said sweeping beam and for producing a plurality of start of scan signals, wherein the time between start of scan signals depends upon the rotation of said multifaceted polygon; and
   an input scanner for digitizing an image on an original source, said input scanner including a light source for radiating light onto the original source; an array of photosensitive elements for producing a plurality of charging currents, wherein each current depends upon the light reflected from a pixel area of the image on the original source; and an integrator for integrating said plurality of charging currents for an integration period;
   wherein said integration period is controlled by start of scan signals.

5. A digital copier according to claim 4, wherein said integration period is a an integer multiple of the time between start of scan signals.

6. A digital copier according to claim 5, wherein said integer multiple is one.

7. An digital copier, comprising:
   an input scanner for digitizing an image on an original document, said input scanner including a platen for holding the original document; a light source for radiating light onto the original document; an array of photosensitive elements for producing a plurality of charging currents, wherein each charging current depends upon the light reflected from a pixel area of a line of an image on the original document; a scanning device producing relative motion between said original document and said elongated array of photosensitive elements such that said elongated array of photosensitive elements sequentially scans said image; and an integrator for integrating said plurality of charging currents for integration periods that are controlled by integration pulses, said integrator for producing a plurality of digital signals that represent said line of said image at the end of each integration period;
   a printer for printing an image on a substrate, said printer including a photoreceptor moving in a process direction; a raster output scanner including a laser source that produces a laser beam that is modulated with image information, said raster output scanner further including a rotating, multifaceted polygon for sweeping said modulated laser beam across said photoreceptor so as to produce a plurality of output scan lines, said printer further including a start of scan detector for detecting said sweeping modulated laser beam and for producing a plurality of start of scan signals, wherein the time between successive start of scan signals depends upon the rotation of said multifaceted polygon; and
   a controller section for receiving said plurality of digital signals that represent the integrated charges and for using those digital signals to produce image information that modulates said laser beam, said controller further for receiving said start of scan signals and for using said start of scan signals to produce said integration pulses; wherein said controller produces integration pulses at a rate that depends upon the rate of said start of scan signals.

8. A digital copier according to claim 7, wherein said start of scan signals occur at a rate that is a fixed multiple of the rate of said integration pulses.

9. A digital copier according to claim 7, wherein said fixed multiple is an integer multiple.

10. A digital copier according to claim 9, wherein said integer multiple is one.

* * * * *